United States Patent [19]

Yamada

[11] Patent Number: 4,956,704
[45] Date of Patent: Sep. 11, 1990

[54] IMAGE PROCESSING APPARATUS AND METHODS FOR MAKING A CREATIVE IMAGE FROM AN ORIGINAL IMAGE

[75] Inventor: Shigeki Yamada, Yokohama, Japan

[73] Assignee: Canon Kabushiki Kaisha, Tokyo, Japan

[21] Appl. No.: 255,465

[22] Filed: Oct. 11, 1988

[30] Foreign Application Priority Data

Oct. 23, 1987 [JP] Japan .................................. 62-266471
Oct. 23, 1987 [JP] Japan .................................. 62-266472
Oct. 23, 1987 [JP] Japan .................................. 62-266473

[51] Int. Cl.⁵ .............................................. G09G 1/28
[52] U.S. Cl. ........................................ 358/80; 358/78
[58] Field of Search ............................... 358/75, 78, 80

[56] References Cited

U.S. PATENT DOCUMENTS 4,794,382 12/1988 Lai et al. ................................ 358/80

FOREIGN PATENT DOCUMENTS

2178628 2/1987 United Kingdom ................... 358/80

Primary Examiner—James J. Groody
Assistant Examiner—Mark R. Powell
Attorney, Agent, or Firm—Fitzpatrick Cella, Harper & Scinto

[57] ABSTRACT

An image processing apparatus and method in which an object is imaged to produce signals and the signals are divided into groups according to areas of the image having edges of high spatial frequency, i.e., large change in same-color characteristics. The signals in selected areas are changed to produce a reproduced image with desired color effects. For example, an edge may be detected in the original image, and the division of the image into areas effected by a closed curve using the edge. The subsequent processing may include changing a color characteristic of at least one of the areas. The color characteristic might, for example, be an average of various values of that characteristic throughout the area in question. The identification of a high-spatial-frequency area can be performed in various ways, e.g., by summing edge components of the original image which extend in a plurality of directions.

52 Claims, 5 Drawing Sheets

| -1 | 0 | 1 |
|----|---|---|
| -1 | 0 | 1 |
| -1 | 0 | 1 |

| 0  | 1  | 1 |
|----|----|---|
| -1 | 0  | 1 |
| -1 | -1 | 0 |

| 1  | 1  | 1  |
|----|----|----|
| 0  | 0  | 0  |
| -1 | -1 | -1 |

IMAGE PROCESSING APPARATUS AND METHODS FOR MAKING A CREATIVE IMAGE FROM AN ORIGINAL IMAGE

BACKGROUND OF THE INVENTION

1. Field of the Invention

The present invention relates to image processing apparatus and methods for altering an original image. More particularly, the invention relates to image processing apparatus and methods for making a creative image from an original image and for extracting a characteristic of an original image.

2. Brief Description of the Related Art

Some image processing methods for making modified images from original images are well known. Such methods have been used for color conversion, for example. In one conventional image processor, an edge component of an object in an original image is extracted from the original image by using a differential operator. Then a modified image is obtained by producing a binary representation of the extracted edge component. In another conventional image processor, a modified image is obtained by producing a binary representation of only the original image. Examples of such methods are described in U.S. Pat. No. 4,538,182 and in U.S. Patent No. 4,885,765 both abandoned and assigned to the assignee of this application.

Those conventional processors paint using false colors or pseudo colors selected from among a limited number of colors to form the modified image. However, comparing paintings obtained by the conventional processors to paintings which are drawn by skillful portrait painters, the paintings by the processors do not have nor faithfully represent the true features of the original image.

SUMMARY OF THE INVENTION

It is an object of the present invention to overcome the above mentioned shortcomings of conventional image processing apparatuses and methods.

It is another object of the present invention to provide image processing apparatus and methods which can modify an original image to get a painting as good as the skillful portrait painters paint.

According to one feature of the present invention, there is provided an image processing apparatus which comprises a discriminator for discriminating a first part of the original image having high spatial frequency and a second part of the original image having low spatial frequency and a processor for modifying the second part of the original image.

According to another feature of the present invention, the original image is divided into a plurality of parts, then the original image data of the plurality of parts is respectively converted with respect to each other in accordance with divided parts.

According to one aspect of the invention there is provided a novel image producing apparatus comprising input means, a signal divider, a signal processor and output means. The input means supplies original image signals which represent an original image. The signal divider is arranged to divide the original image data signals into a plurality of groups corresponding, respectively, to original image areas whose edges are defined by a predetermined differential thereacross of a given color characteristic. The signal processor is arranged to change a color characteristic of at least one of the groups of signals; and the output means is arranged to output signals from the signal processor.

According to another aspect of the invention there is provided input means, a signal discriminator, a signal processor and output means. The input means is arranged to supply original image data signals which represent an original image. The signal discriminator is arranged to discriminate a first group of the original data signals characterized by image data of high spatial frequency and a second group of the original image data signals characterized by image data of low spatial frequency. The signal processor is arranged to produce color conversions of the original image data of the record group of original image data signals; and the output means is arranged to output signals from the signal processor.

In another aspect the invention involves a method for processing images comprising the steps of supplying original image data signals representing an original image, dividing the original image data signals to a plurality of groups corresponding, respectively, to original image areas whose edges are defined by a predetermined differential thereacross of a given color characteristic, changing a color characteristic of the signals of at least one of the groups and outputting the thus changed signals.

In a still further aspect, the invention involves a method for processing images comprising the steps of supplying original image data signals which represent an original image, discriminating a first group of the original image data signals characterized by image data having high spatial frequency and a second group of the original image data signals characterized by image data having low spatial frequency, producing color conversion of the original image data of the second group of original image data signals and outputting signals representing the converted original image date.

The foregoing summary of certain more important features of the invention is provided in order that the detailed description of the preferred embodiments thereof that follows may be better understood and in order that the present contribution to the art may be better appreciated. There are, of course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

Figure 1:
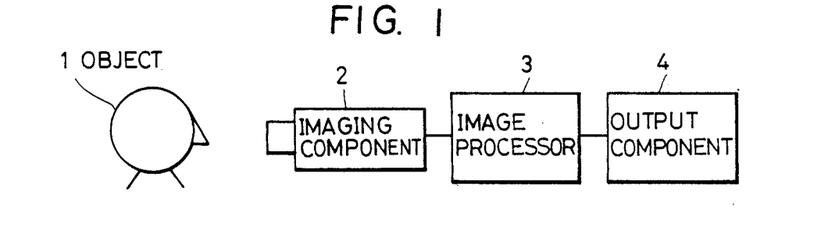
FIG. 1 is a block diagram of a portrait forming apparatus embodying the present invention.

The portrait forming apparatus shown in FIG. 1 includes an imaging component 2 for imaging an object 1 (e.g. a person's face), an image processor 3 for processing image signals obtained by the imaging component and an output component 4 which outputs a finished image from the image processor 3 as a hard copy.

Image data of the object 1 is processed as follows:

The person's face, which is to be represented as a portrait or a likeness, is imaged by the imaging component 2, e.g., a television camera structured by a solid state image sensor, an imaging tube or corresponding opto electrical conversion apparatus. The image data is obtained by the imaging component 2 in analog form. It is then converted to digital image data and is input into the image processor 3. The image processor 3 carries out various processes to form a resultant signal which is then applied to the output component 4, causing it to print the portrait as a hard copy.

Figure 2:
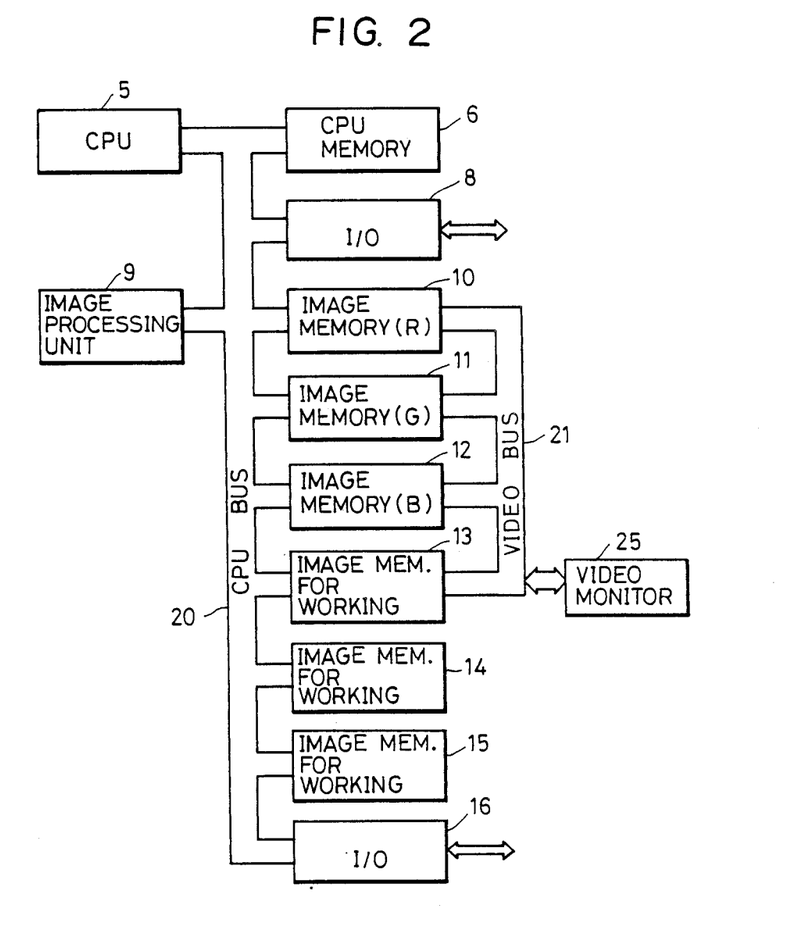
FIG. 2 a block diagram of a image processor used in the apparatus of FIG. 1.

FIG. 2 shows a detailed block diagram of the image processor 3.

The image processor 3 includes a CPU (Central Processing Unit) 5 for controlling operation of the other components of the image processor. A CPU memory 6 is also provided to store a program for processing numerical data representative of an image and flag data representative of parameters which are controlled by the CPU 5. An I/O (Input/Output) interface 8 is provided for connecting the processor 3 to a tablet which inputs address information to the CPU 5. An image processing unit 9 is also provided to receive image data from one of several image data memories 10 through 15 in accordance with a command from the CPU 5. The processing unit 9 performs calculations for image processing and then outputs a resultant signal to a selected one of the image memories 10 through 15 or to an image data I/O interface 16.

Four of the image memories, i.e. 10 through 14, are each structured as a 512×512×8 bit memory. The fifth image memory 15 is a working memory and has a capacity of 512×512×16 bits. The working memory is used for image signal calculation, cumulative adding, multiplying, dividing, etc. The image memories 10 through 14 can be read from and written into. In addition, calculations can be performed on data transferred between each of the memories 10 through 15. The image data I/O interface 16, which is connected to the imaging component 2 and the output component 4 in FIG. 1, inputs image data from the imaging component 2 and outputs image data to the output component 4.

Figure 3:
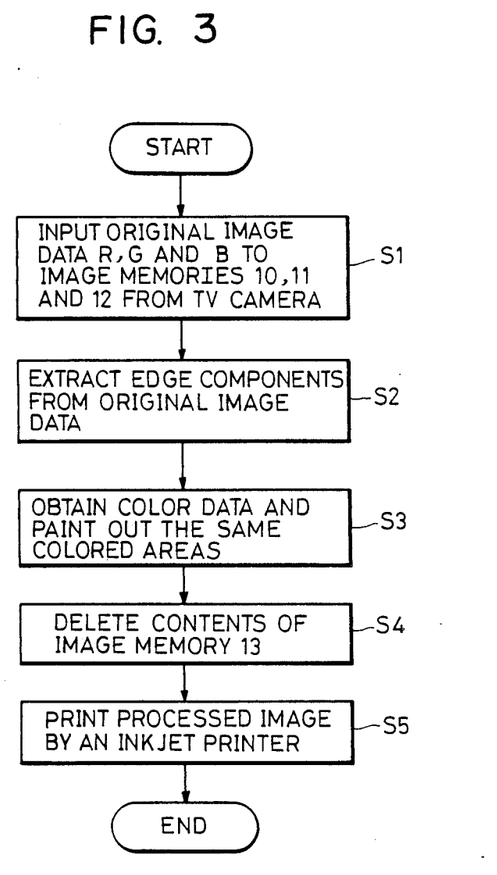
FIG. 3 a flowchart illustrating processes carried out by the image processor of FIG. 2.

FIG. 3 shows a flowchart illustrating the process of forming a portrait as carried out by the image processor 3 in FIG. 2. The operation steps are described below.

It should be noted that red data, green data and blue data which are used to form a digital image, are represented, respectively, by R, G and B. Each of these data categories has eight bits for one image element, whereby each item of color data can be expressed as any of two hundred fifty six gradation levels. Level "255" is highest brightness level, and level "0" is the lowest brightness level.

(Step S1)

After it has been determined to form an image of a person's face 1 and after suitable lighting for the person's face is obtained, a start command for starting the process is transmitted from the tablet via the I/O interface 8 to the CPU 5. After the CPU 5 receives the start command, the CPU 5 orders the image data I/0 interface 16 to input image data from the imaging component 2 (FIG. 1) into the image memories 10, 11, 12. This three color image data includes R, G and B components, each of which is quantized into eight bits.

The image memories 10, 11 and 12 respectively store data corresponding to one of the R, G and B data. Thus an operator can convert the contents of these image memories 10, 11 and 12 with a CRT (cathode ray tube) monitor 25 (FIG. 2) via a video bus 21.

(Step S2)

The image processor 3 carries out a process, hereinafter referred to as "same color area setting process", according to which an image is divided into a plurality of areas.

In this same colored area setting process, edge components in the image are detected by using a differential operator.

Figure 5A:
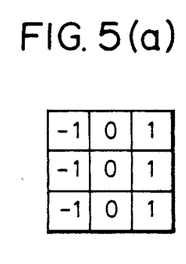
FIGS. 5a, 5b, and 5c are a series of diagrams showing three examples of differential operators used in the apparatus of FIG. 1.

Some examples of typical differential operators are shown in FIG. 5(a), (b) and (c). At first the red image data R in the image memory 10 is processed by the differential operator shown in FIG. 5(a) to obtain an edge component. The thus obtained edge component is temporarily stored in the work memory 14 and then the edge component is transferred to another work memory 13.

Figure 5B:
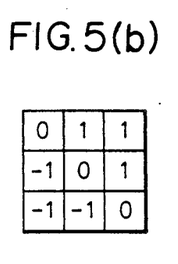

The red image data R is then processed by the differential operator shown in FIG. 5(b), which is rotated by 45 degrees in respect of FIG. 5(a), to obtain another edge component. This other edge component is stored into the work memory 14. The contents of the work memory 14 and the work memory 13 are then combined in a summation; and the result of this operation is stored in the work memory 13 as new edge data.

Figure 5C:
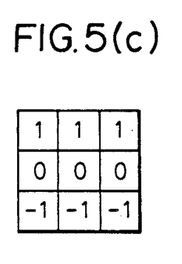

Similarly, the image data R is processed by the differential operator shown in FIG. 5(c), which is rotated by 45 degrees in respect of FIG. 5(b), to obtain another edge component. This other edge component is temporarily stored in the work memory 14; and then a result of summation of the contents of the work memories 13 and 14 is stored into the work memory 13. Five additional operators (not shown) are also provided, each rotated from the next by 45 degrees. The above-described processing and summation is produced for each operator and the results of the summations are stored in the work memory 13.

After the above described processing of the red image data R in the memory 10 has been completed, similar processes for the remaining image data G and B, are carried out in the memories 11 and 12 respectively. All of the resulting edge components R, G and B are then summed. Finally, the values in the work memory 13 are compared with a predetermined threshold level for all picture elements to obtain a bi-level signal wherein "1" represents a part of an edge and "0" represents a part of a non-edge. Accordingly the image is divided into a plurality of closed areas by edge loops. These closed areas constitute the "same colored areas" in this specification.

Figure 6:
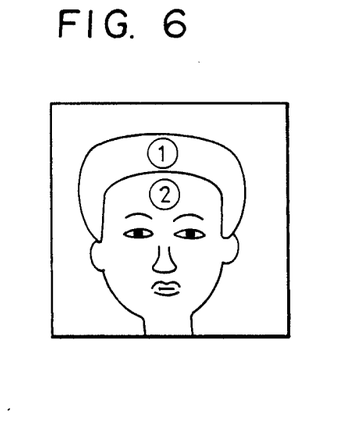
FIG. 6 is a representation of an image processed according to the present invention and useful for explaining the processing of same color areas.

FIG. 6 shows an example of a result of the above described processes. In FIG. 6, black lines show that part of an image which has a mostly a high spatial frequency, and the remaining white parts have mostly a low spatial frequency. By "high spatial frequency" is meant that some color characteristic, e.g., hue, lightness or saturation, changes rapidly or experiences a differential value over a small distance along the image. Parts of the image that have "low spatial frequency" are characterized by a color characteristic which has a small change or differential along the image.

Figure 4:
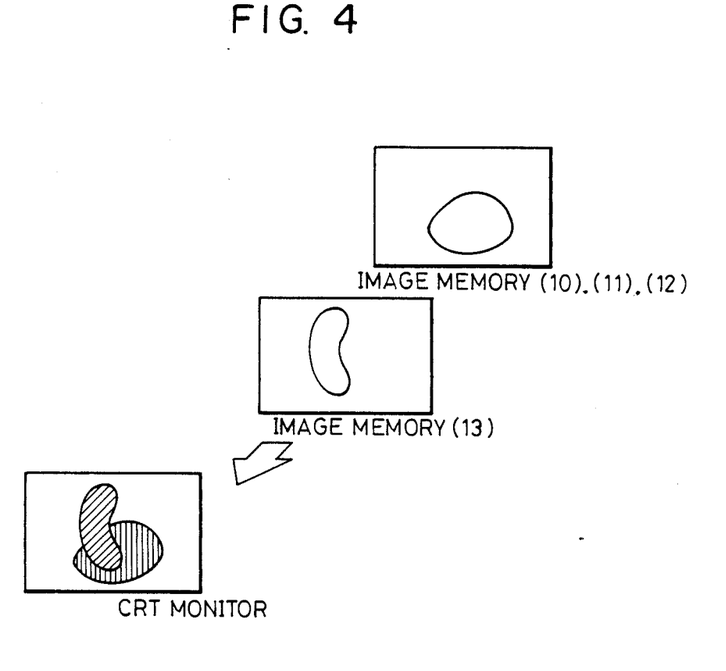
FIG. 4 is a series of diagrams illustrating a displaying priority feature of the apparatus of FIG. 1.

FIG. 4 shows the effect of giving priority to selected image memories for display of image data on a CRT monitor. The image memory 13 is given higher priority than the image memories 10, 11 and 12 so that the original image 1 from the image memories 10, 11 and 12 becomes overlapped at the edge line of the image signal from image memory 13.

It will be noted that in this embodiment, eight edge components are summed, and then the summed values are compared to threshold values. However, each component may also first be compared to a predetermined value to obtain a binary edge signal for each component, these binary edge signals may be subjected to a logical OR operation in sequences and then edge data like the edge data shown in FIG. 6 is obtained.

Further, although eight directional edge components are detected in this embodiment, four or six directional edge components may be enough to detect the high spatial frequency component and to make loops of edge lines.

(Step S3)

The image processor 9 (FIG. 2) calculates average values of the R, G and B data in the same colored area which is surrounded by an edge line in the image memory 13 in response to a command of the CPU 5. Then the same colored area of the image memories 10, 11 and 12 is painted out with the average values of R, G and B. The painted out area corresponds to the part of edge whose value is "0" in the image memory 13, namely the white part in FIG. 6 which is a part having low spatial frequency. In other words, each item of data in the memories 10, 11 and 12 is changed to the average of each of the same colored area. On the other hand, in the black part in FIG. 6 which is a part having high spatial frequency, the original image data remains unchanged. That is, the data in the memories 10, 11 and 12 is not changed. Thus, in part of the high spatial frequency areas, e.g., the edge of the eye, the edge of the hair, etc. the original image data is preserved; and the parts of low spatial frequency are painted out with average image data of the same colored areas.

(Step S4)

The contents of the image memory 13 are deleted. As a result, black lines representing the edge part in FIG. 6 are deleted and the portrait is completed on a screen of the CRT monitor 25.

(Step S5)

The image data R, G and B in the image memories 10, 11 and 12 are output to an inkjet video printer comprising the printing component 4 in FIG. 1. Thus, the portrait is completed on a paper as a hard copy. The portrait on the paper looks like a portrait which is painted by a professional illustrator by hand.

In the foregoing, the imaging object is the face of a person, but the imaging object can be some other object or a landscape.

Further, in the above described embodiment, the image data is obtained by an imaging device, but the image data may be obtained from other sources of digital image conformation such as a video cassette recorder (VCR), a video disk, semiconductor memories, or communication lines, etc.

(Another example of Step S3)

It should be noted that flesh color or skin color in the same colored area of faces is very impressive to observers. Actually, if the same colored area is painted out with average data in the area, the resulting color is generally not favorable to most observers. Thus, as another example of Step S3, it is provided that the most favorable color data of skin or flesh color is pre stored; and then the same-colored area of skin is automatically painted out with this pre stored data.

In another example of Step S3, the image processor 9 labels each of the same colored areas which are surrounded by the edge lines to distinguish particular areas, e.g., an area of the hair and an area of the facial skin in accordance with a command of the CPU 5.

In this example, the two largest areas of the image are selected, then the upper area among them is assumed or determined by the area of the hair (1) in FIG. 6 and the lower area among them is assumed or determined by the area of the facial skin (2) in FIG. 6. These two areas (1) and (2) are respectively painted out with pre-set colors stored in the CPU memory 6. Thus, the image processing unit 9 changes the image data of the areas (1) and (2) to image data in the CPU memory in accordance with a command of the CPU 5.

In this example, the areas of the hair and the face's skin which are not set by "1" in the work memory 13 are painted out. That is the white part in FIG. 6 which is a part of lower spatial frequency, is painted out with pre-stored colors, and the black part in FIG. 6 which is a part having high spatial frequency is preserved as original image data.

In another example, the part having high spatial frequency is preserved and the part having low spatial frequency is painted out with pre-stored identical colors. The output hard copy of this example looks like an illustration painted with poster colors by a skillful illustrator. In this example only color data of the hair and facial skin is pre stored; however, color data which corresponds to a number of divided areas, e.g., irises of eyes and lips, can also be pre-stored.

(Another example of Step S2)

In the first example closed areas are made in most cases. However, sometimes closed areas can not be made in parts of eyebrows and lips, because boundaries between skin and eyebrows or lips are not very clear and differences of brightness at the boundaries are not very large.

Figure 7:
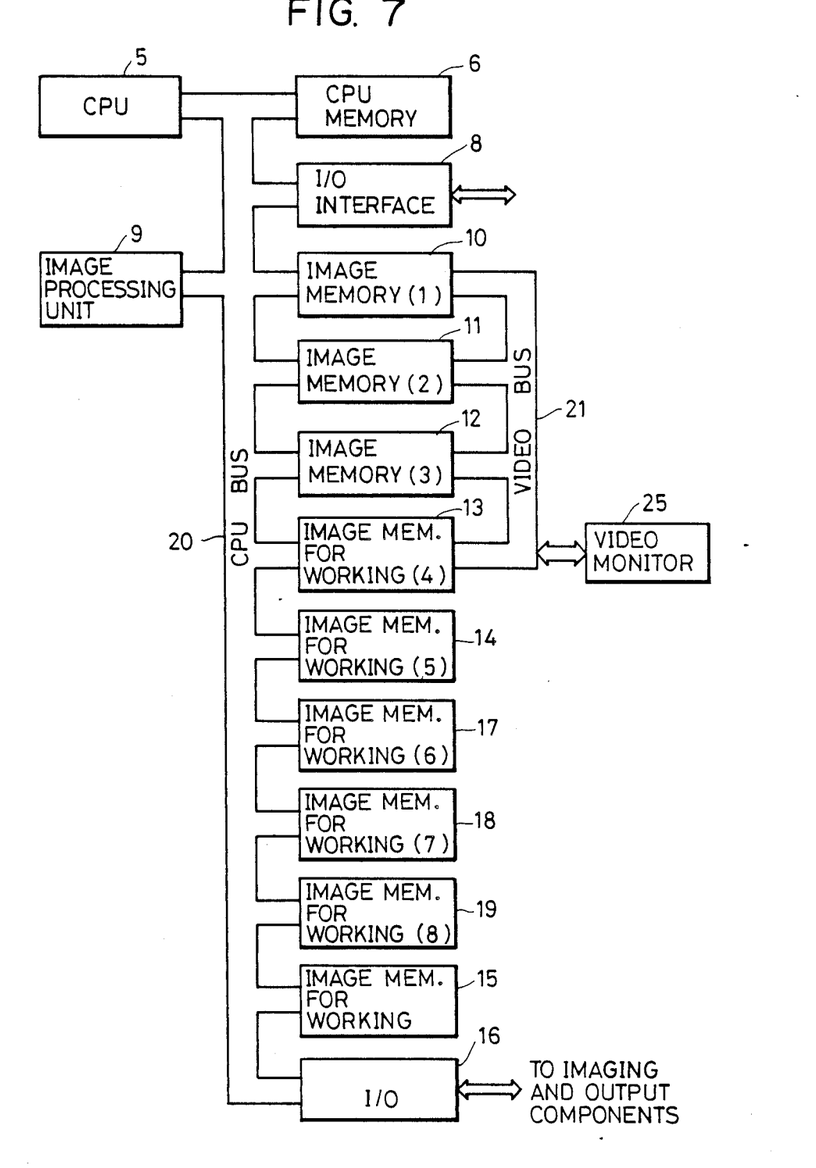
FIG. 7 is a block diagram of an image processor used in another embodiment.

The embodiment shown in FIG. 7 is directed to this problem. In FIG. 7, work memories 17, 18 and 19 are added. Also, after completion of the process of the step S2 in FIG. 3, binary image data is made by using a different threshold level for each item of color data R, G and B. The binary image data is stored in the work memories 17, 18 and 19. Then edge components are detected from the binary image data in the work memories 17, 18 and 19 and these edge components are stored in the work memory 14. Further, the edge data which is obtained by the step S2 in FIG. 3 in the work memory 13 and the binary image data in the work memory 14 are processed according to a logical OR operation; and the results of the operation are stored in the work memory 13.

Since the binary image edge data is also used for making edge lines, the closed areas are sure to be made. In this embodiment a three dimensional object is imaged directly by the television camera 2 (FIG. 1), but such image data might also be obtained from prints, films or photographs.

Further, although a television camera is used in the foregoing embodiment, image data can be obtained from various recording media, e.g., still video floppy discs, video tapes, magnetic discs, optical discs, etc. or from communication lines, e.g., telephone lines, exclusive lines, etc.

Although the face of a person is used as an object for image processing in the foregoing example, landscapes or still lines can also comprise the object of these image processing operations. In such case the above described embodiment operates as follows:

(1) An additional image memory is provided for storing data for areas which have high spatial frequency. This additional image memory is additional to the image memories which store original image data. The original image data at areas having high spatial frequency still remain and areas of low spatial frequency are painted out with predetermined colors which are automatically obtained from original image data or which are pre stored as desired colors in the additional image memory.

Thus, the low spatial frequency areas, e.g., the facial skin and hair, are painted out, while on the other hand, the high spatial frequency areas, e.g., edges of eyes or edges of hair, are reproduced with complete fidelity. Therefore a completed hard copy obtained by these processes looks like a portrait which is painted by a skillful illustrator on paper. (2) Portraits can be made automatically with minimal skill, sensitivity and expertise required of the operator (3) Since the painted out areas occupy a large portion of all areas of one example and since variations of gradation are very few, an inkjet printer, which is not favored to express a halftone image, can be used as an output printer of portraits obtained by these processes. Further, colors to be painted out be can be selected promptly and stored in the memory in accordance with a coloring characteristic of the printer to be used, so that optimum colors will be expressed on the hard copy. Of course printers other than inkjet printers might be used in the present invention.

Although in this specification particular portrait making apparatus are explained, it should be understood that the present invention also applies to apparatus which convert original image data to other image data without limiting color data.

For example, the invention may be used for making animated illustrations, posters and images similar to woodcuts or lithographs, from original images. Further, the present invention may be used for altering plain paintings having no variation in brightness so that they look solid and have substantial variation in image brightness.

As described above, creative images as skillful painters paint, can be obtained without the skill, expertise or sensitivity of skillful painters.

The various components illustrated herein in block form are well known or their construction will be readily apparent to those of ordinary skill in the art from the description given herein. Since the details of the construction of these individual components are not part of the invention and do not relate to the best mode for carrying out the invention, in the interest of a full, clear concise and exact description of the invention those extraneous details are not set forth herein.

Although particular embodiments of the present invention are herein described in detail for purposes of explanation, various modifications thereof, after study of this specifications, will be apparent to those skilled in the art to which the invention pertains.

I claim:

1. An image processing apparatus, comprising:
   input means for supplying original image data signals which represent an original image;
   detection means for detecting an edge proper to the original image represented by the original image data signals;
   dividing means for dividing the original image into a plurality of areas by a closed curve using the edge detected by said detection means; and
   a signal processor for changing a color characteristic of the original image data signals with respect to at least one of the plurality of areas of the original image.

2. An image processing apparatus according to claim 1, wherein said detection means is constructed and arranged to detect an edge of the original image in accordance with high spatial frequency components of the original image data signals.

3. An image processing apparatus according to claim 1, wherein said signal processor is constructed and arranged to change the original image data signals of at least one of said areas in a predetermined manner corresponding to a color characteristic present in the area.

4. An image processing apparatus according to claim 3, wherein said color characteristic present in the area is an average of various values of said color characteristic throughout said area.

5. An image processing apparatus according to claim 3 wherein said signal processor includes a memory containing data representing a predetermined output color characteristic, said memory being arranged to change said color characteristic according to said data.

6. An image processing apparatus according to claim 2, wherein said signal processor is arranged to change the color characteristic of signals other than those having the high spatial frequency components.

7. An image processing apparatus according to claim 2, wherein said detection means is arranged to detect the high spatial frequency components by summing edge components extending in a plurality of directions.

8. An image processing apparatus according to claim 1, wherein said input means is arranged to supply original color image data signals, and wherein said signal processor is arranged to change the original color image data signals in at least one of the areas to identical color image data signals.

9. An image processing apparatus according to claim 1, wherein said signal processor is constructed to cause the color characteristic of at least one of said areas to be uniform throughout the area.

10. An image processing apparatus, comprising:
    input means for supplying original image data signals which represent an original image;

a signal discriminator for discriminating a first group of the original image data signals characterized by image data of high spatial frequency and a second group of the original image data signals characterized by image data of low spatial frequency;

a signal processor for producing color conversion of original image data of the second group of original image data signals; and output means for outputting signals whose color characteristic has been changed by said signal processor.

11. An image processing apparatus according to claim 10, wherein said signal processor is constructed and arranged to convert the original image data of the second group according to a predetermined image characteristic which is present among the original image data of the second group.

12. An image processing apparatus according to claim 11, wherein the predetermined image characteristic is an average value of the original image data of said second group.

13. An image processing apparatus according to claim 10, wherein said signal processor includes a memory containing data representing a predetermined image characteristic, said memory being arranged to change the original image data of the second group according to said data.

14. An image processing apparatus according to claim 10, wherein said signal processor is constructed to leave the original image data signals of the first group unchanged during signal processing.

15. An image processing apparatus according to claim 10, wherein the signal discriminator is arranged to detect the first group of original image data signals by detecting edge components of the original image data signals extending in a plurality of directions.

16. An image processing apparatus according to claim 10, wherein said input means is arranged to supply signals representing original color image data, and said wherein signal processor is arranged to change the original color image data in said second group to predetermined color image data.

17. An image processing apparatus according to claim 10, wherein said signal processor is constructed to produce a color conversion of the original image data of said second group of signals such that a portion of the image represented by the second group of signals has uniform color throughout.

18. A method for processing images, comprising the steps of:

supplying original image data signals representing an original image;

detecting an edge proper to the original image represented by the original image data signals;

dividing the original image into a plurality of areas by a closed curve using the edge detected in said detecting step;

changing a color characteristic of the original image data signals with respect to at least one of said plurality of areas of the original image.

19. A method according to claim 18, wherein said dividing step includes detecting an edge of the original image in accordance with high spatial frequency components of the original image data signals.

20. A method according to claim 18, wherein said changing step includes changing the original image data signals of at least one of said areas in a predetermined manner corresponding to a color characteristic present in the area.

21. A method according to claim 20, wherein said color characteristic present in the area is an average of various values of said color characteristic throughout said area.

22. A method according to claim 18, further comprising the step of pre-storing in a memory signals representative of the color characteristic present in the area.

23. A method according to claim 19, wherein the high spatial frequency components are detected by detecting edge components of said original image data signals extending in a plurality of directions.

24. A method according to claim 18, wherein said supplying step includes supplying original color image data signals and said changing step includes changing the original color image data signals in at least one of the areas to predetermined color image data signals.

25. An image processing method according to claim 19, wherein said changing step includes processing the original image data signals in an area other than an area having the high spatial frequency components.

26. A method according to claim 18, wherein the step of changing a color characteristic comprises causing signals representing said at least one to produce a uniform color throughout the image area.

27. A method for processing images comprising steps of:

supplying original image data signals which represent an original image;

discriminating a first group of the original image data signals characterized by image data having high spatial frequency and a second group of the original image data signals characterized by image data having low spatial frequency;

producing color conversion of original image data of the second group of original image data signals; and outputting signals representing the converted original image data.

28. A method according to claim 27, wherein said producing step includes converting the original image data of the second group according to a predetermined image characteristic in the original image data of the second group.

29. A method according to claim 28, wherein said predetermined image characteristic corresponds to an average value of the original image data of said second group.

30. A method according to claim 27, further including the step of pre-storing in a memory signals representative of a predetermined image characteristic.

31. A method according to claim 27, wherein the step of producing color conversion is carried out while leaving the original image data signals of the first group unchanged.

32. A method according to claim 27, wherein the first group of original image data signals is discriminated and summing edge components of the original image data signals extending in a plurality of directions.

33. A method according to claim 27, wherein the original image data signals supplied in said supplying step include original color image data, and wherein, in said producing step, the original color image data are converted to predetermined identical color image data.

34. A method according to claim 27, wherein the step of producing color conversion comprises causing said second group of original image data signals to produce a uniform color throughout image area corresponding to said second group.

35. An image processing apparatus comprising:
means for supplying an original image;
means for dividing the original image into a plurality of areas, wherein said dividing means detects an edge of the original image and divides the original image by a closed curve using the edge; and
means for changing at least one of the plurality of areas of the original image to halftone.

36. An image processing apparatus according to claim 35, wherein said dividing means is constructed and arranged to divide the original image into a plurality of areas in accordance with high spatial frequency components of data signals representing the original image.

37. An image processing apparatus according to claim 35, further comprising a signal processor constructed and arranged to change data signals corresponding to at least one of said areas in a predetermined manner corresponding to a color characteristic present in the area.

38. An image processing apparatus according to claim 37, wherein said color characteristic present in the area is an average of various values of said color characteristic throughout said area.

39. An image processing apparatus according to claim 37, wherein said signal processor includes a memory containing data representing a predetermined output color characteristic, said memory being arranged to change said color characteristic according to said data.

40. An image processing apparatus according to claim 37, wherein said processor is arranged to change the color characteristic of signals other than those having a high spatial frequency component.

41. An image processing apparatus according to claim 36, wherein said dividing means is arranged to detect high spatial frequency components by summing edge components extending in a plurality of directions.

42. An image processing apparatus according to claim 37, wherein said supplying means is arranged to supply original color image data, and wherein said signal processor is arranged to change the original color image data signals in at least one of the areas to identical color image data.

43. An image processing apparatus according to claim 37, wherein said signal processor is constructed to cause the color characteristic of at least one of said areas to be uniform throughout the area.

44. An image processing apparatus comprising:
means for supplying original image data signals which represent an original image;
means for detecting an edge of the original image represented by the original image data signals;
means for dividing the original image into a plurality of areas by a closed curve using the edge detected by said detecting means; and
means for painting at least one of said plurality of areas of the original image represented by the original image data signals.

45. An image processing apparatus according to claim 44, wherein said detecting means is constructed and arranged to detect an edge of the original image in accordance with high spatial frequency components of the original image data signals.

46. An image processing apparatus according to claim 44, wherein said painting means is constructed and arranged to paint at least one of said areas in a predetermined manner corresponding to a color characteristic present in the area.

47. An image processing apparatus according to claim 46, wherein said color characteristic present in the area is an average of various values of said color characteristic throughout said area.

48. An image processing apparatus according to claim 46, wherein said painting means includes a memory containing data representing a predetermined output color characteristic, said memory being arranged to paint the area according to said data.

49. An image processing apparatus according to claim 45, wherein said painting means is arranged to paint a predetermined area other than areas having high spatial frequency components.

50. An image processing apparatus according to claim 45, wherein said detecting means is arranged to detect high spatial frequency components by summing edge components extending in a plurality of directions.

51. An image processing apparatus according to claim 44, wherein said supplying means is arranged to supply original color image data, and wherein said painting means is arranged to paint at least one of the areas to identical color image data.

52. An image processing apparatus according to claim 44, wherein said painting means is constructed to cause the color characteristic of at least one of said areas to be uniform throughout the area.

* * * * *